(12) United States Patent
Aoyagi et al.

(10) Patent No.: US 11,778,444 B2
(45) Date of Patent: Oct. 3, 2023

(54) NETWORK NODE AND BASE STATION DEVICE

(71) Applicant: NTT DOCOMO, INC., Tokyo (JP)

(72) Inventors: Kenichiro Aoyagi, Tokyo (JP); Hiroshi Ishikawa, Tokyo (JP); Shinya Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/251,083

(22) PCT Filed: Apr. 2, 2019

(86) PCT No.: PCT/JP2019/014651
§ 371 (c)(1),
(2) Date: Dec. 10, 2020

(87) PCT Pub. No.: WO2020/003677
PCT Pub. Date: Jan. 2, 2020

(65) Prior Publication Data
US 2021/0258762 A1    Aug. 19, 2021

(30) Foreign Application Priority Data

Jun. 25, 2018 (JP) .................. 2018-120108

(51) Int. Cl.
*H04W 4/90* (2018.01)
*H04W 88/14* (2009.01)
*H04W 92/04* (2009.01)

(52) U.S. Cl.
CPC ............. *H04W 4/90* (2018.02); *H04W 88/14* (2013.01); *H04W 92/045* (2013.01)

(58) Field of Classification Search
CPC ..... H04W 4/90; H04W 88/14; H04W 92/045; G08B 25/016; G08B 25/10
See application file for complete search history.

(56) References Cited

U.S. PATENT DOCUMENTS 9,247,407 B1*   1/2016   Schumacher ........... H04W 4/90
2011/0165885 A1*   7/2011   Kodikara Patabandi .....................
                                                                H04W 76/11
                                                                455/450

(Continued)

FOREIGN PATENT DOCUMENTS

CN      102821378 A    12/2012
JP      2014158229 A    8/2014

OTHER PUBLICATIONS

International Search Report issued in PCT/JP2019/014651 dated Jun. 25, 2019 (3 pages).

(Continued)

*Primary Examiner* — Charles N Appiah
*Assistant Examiner* — Frank E Donado
(74) *Attorney, Agent, or Firm* — Osha Bergman Watanabe & Burton LLP

(57) ABSTRACT

A network node for connecting to a plurality of base station devices, the plurality of base station devices each being connected to one or a plurality of core networks belonging to different systems, the network node including a controller that controls delivery of emergency information identical to delivery of emergency information activated by a first core network of the plurality of core networks so that the delivery of the emergency information identical to the delivery of the emergency information activated by the first core network of the plurality of core networks is prevented from being activated by a core network other than the first core network; and a transmitter that transmits a message for a base station device to deliver emergency information.

6 Claims, 11 Drawing Sheets

(56) References Cited

U.S. PATENT DOCUMENTS

| | | | | |
|---|---|---|---|---|
| 2017/0318445 | A1* | 11/2017 | Kodaypak | H04W 4/90 |
| 2019/0246260 | A1* | 8/2019 | Edge | G08B 27/006 |
| 2019/0313232 | A1* | 10/2019 | Lee | H04W 4/90 |
| 2019/0372693 | A1* | 12/2019 | Kodaypak | H04H 20/59 |
| 2020/0128460 | A1* | 4/2020 | Takakura | H04W 36/16 |
| 2020/0336885 | A1* | 10/2020 | Schliwa-Bertling | H04L 65/1016 |
| 2021/0168704 | A1* | 6/2021 | Kawasaki | H04W 36/14 |

OTHER PUBLICATIONS

Written Opinion of the International Searching Authority issued in PCT/JP2019/014651 dated Jun. 25, 2019 (3 pages).
3GPP TS 38.401 V15.1.0; "3rd Generation Partnership Project; Technical Specification Group Radio Access Network; NG-RAN; Architecture description (Release 15)"; Mar. 2018 (23 pages).
Office Action issued in Chinese Application No. 201980041702.5; dated Sep. 23, 2021 (13 pages).
Office Action issued in Japanese Application No. 2020-527218; dated Apr. 19, 2022 (3 pages).
Office Action in counterpart Japanese Patent Application No. 2020-527218 dated Jan. 18, 2022 (7 pages).
Ericsson; "Impact of 5GC on LTE features"; 3GPP TSG-RAN WG2 #99, R2-1709553; Berlin, Germany; Aug. 21-25, 2017 (9 pages).
Extended European Search Report issued in European Application No. 19824958.3, dated Feb. 18, 2022 (14 pages).
Office Action issued in the counterpart Indonesian Application No. P00202100204, dated May 12, 2023 (6 pages).

* cited by examiner

NETWORK NODE AND BASE STATION DEVICE

TECHNICAL FIELD

The present invention relates to a network node and a base station device in a radio communication system.

BACKGROUND ART

In 3rd Generation Partnership Project (3GPP), to further increase the system capacity, to further increase the data transfer rate, and to further reduce latency in the radio section, a radio communication technology called 5G or New Radio (NR) has been studied (hereafter, the radio communication technology is referred to as "5G" or "NR"). In 5G, to achieve requirements including a throughput of greater than or equal to 10 Gbps and latency of less than or equal to 1 ms in the radio section, various radio technologies have been studied.

A network architecture that has been studied in NR includes 5G Core Network (5GC) corresponding to Evolved Packet Core (EPC) that is a core network in the Long Term Evolution (LTE) network architecture and Next Generation-Radio Access Network (NG-RAN) corresponding to Evolved Universal Terrestrial Radio Access Network (E-UTRAN) that is a radio access network (RAN) in the LTE network architecture (see, for example, Non-patent Document 1).

RELATED ART DOCUMENT

Non-Patent Document

Non-Patent Document 1: 3GPP TS 38.401 V15.1.0 (2018-March)

SUMMARY OF THE INVENTION

Problem to be Solved by the Invention

When a user device is located in 5GC via a base station device that performs shared operation of 5GC and EPC, there may be cases where an emergency information delivery message from the EPC side and an emergency information delivery message from the 5GC side are received in a duplicated manner.

The present invention has been made in view of the foregoing, and it is an object of the present invention to enable a base station device, which is connected to a plurality of core networks, to appropriately deliver a message to a user device.

Means for Solving the Problem

According to the disclosed technology, there is provided a network node for connecting to a plurality of base station devices, the plurality of base station devices each being connected to one or a plurality of core networks belonging to different systems, the network node including a controller that controls delivery of emergency information identical to delivery of emergency information activated by a first core network of the plurality of core networks so that the delivery of the emergency information identical to the delivery of the emergency information activated by the first core network of the plurality of core networks is prevented from being activated by a core network other than the first core network; and a transmitter that transmits a message for a base station device to deliver emergency information.

Advantage of the Invention

According to the disclosed technology, a base station device connected to a plurality of core networks is enabled to appropriately deliver a message to a user device.

EMBODIMENTS OF THE INVENTION

Figure 1:
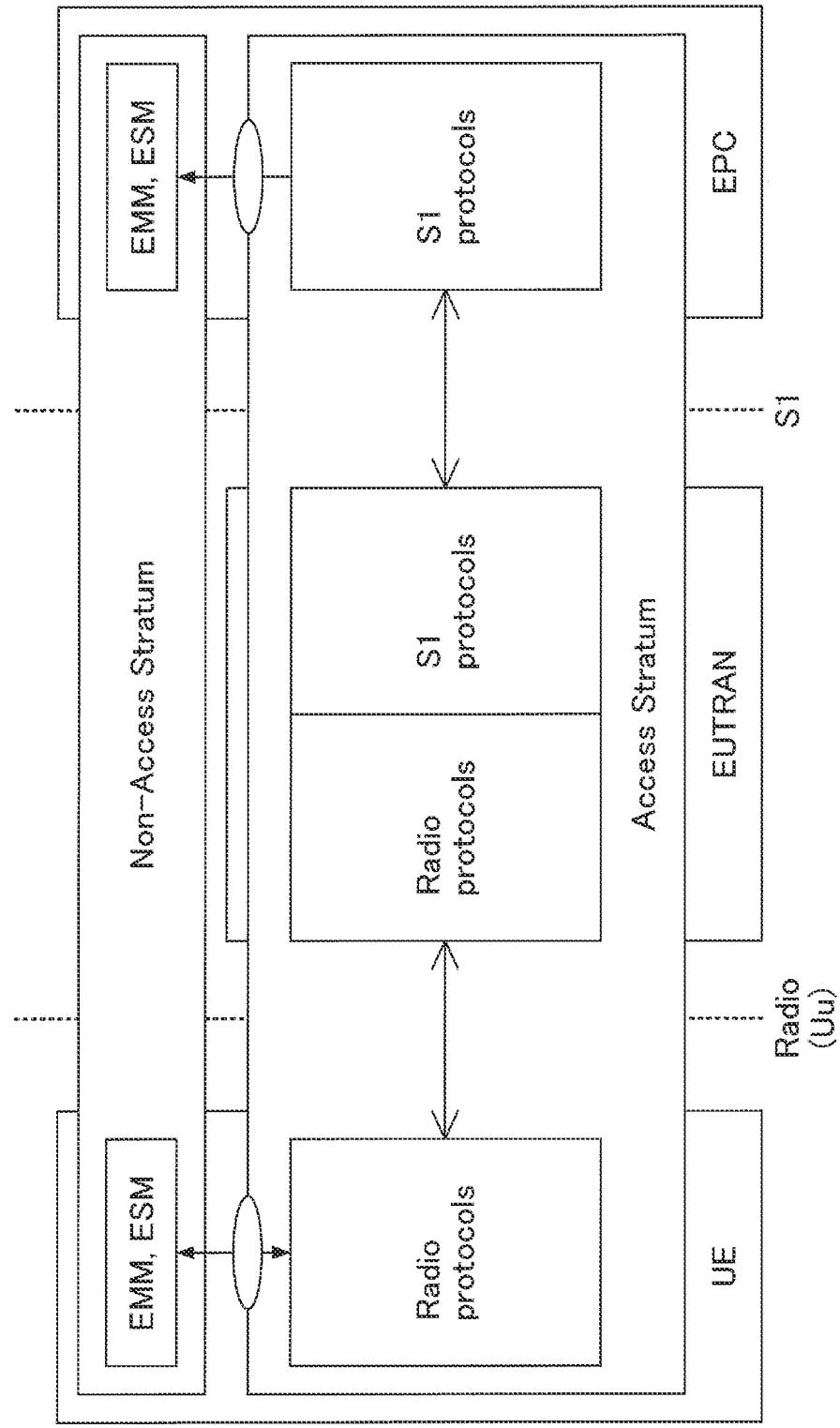
FIG. 1 is a diagram illustrating an example (1) of a network architecture according to an embodiment of the present invention.

Embodiments of the present invention are described below with reference to the accompanying drawings. Embodiments described below are examples, and the present invention is not limited to those embodiments.

In operations of a radio communication system according to an embodiment of the present invention, related-art technologies may also be used as necessary. The related-art technologies are, for example, but are not limited to, current LTE technologies. Unless otherwise mentioned, the term "LTE" used in the present application has a broad meaning and includes LTE-Advanced, systems subsequent to LTE-Advanced (e.g., NR or 5G), and a wireless local area network (LAN).

In the embodiments of the present invention described below, terms such as SS (Synchronization Signal), PSS (Primary SS), SSS (Secondary SS), PBCH (Physical Broadcast channel), PRACH (Physical RACH), DL (Downlink), UL (Uplink), and the like used in existing LTEs are used. The use of these terms is merely for convenience of reference and may be referred to by other names as similar signals, functions, and the like.

In embodiments of the present invention, the duplex scheme may be a TDD (Time Division Duplex) scheme, FDD (Frequency Division Duplex) scheme, or any other scheme (e.g., Flexible Duplex, etc.).

Also, in the following description, a method of transmitting signals using a transmission beam may be digital beam forming in which a precoding vector transmits a multiplied (pre-coded with a precoding vector) signal, or analog beam forming in which beam forming is implemented using a variable phase shifter in a RF (Radio Frequency) circuit. Similarly, a method of receiving a signal using a reception beam may be digital beam forming, which multiplies a received signal by a predetermined weight vector, or analog beam forming, which implements beam forming using a variable phase shifter in an RF circuit. Hybrid beam forming, which combines digital and analog beam forming, may be applied. Further, transmission of a signal using a transmission beam may be transmission of a signal via a particular antenna port. Similarly, reception of a signal using a reception beam may be reception of a signal via a particular antenna port. The antenna port refers to a logical antenna port or a physical antenna port defined in the 3GPP standard.

The method of forming a transmission beam and a reception beam is not limited to the aforementioned methods. For example, in a base station device with multiple antennas or a user device, a method of varying angles of respective antennas may be used; a method using a precoding vector may be combined with a method varying angles of antennas; a method of switching different antenna panels may be used; or different methods of combining multiple antenna panels may be used; or other methods may be used. Further, multiple mutually different transmission beams may be used in high frequency bands, for example. The use of multiple transmission beams is called a multibeam operation, and the use of a single transmission beam is called a single beam operation.

In the embodiments of the present invention, the term "configure" may mean that a predetermined value is pre-configured or defined, or that a radio parameter indicated by a base station device or a user device is configured.

FIG. 1 is a diagram illustrating an example (1) of a network architecture according to an embodiment of the present invention. FIG. 1 illustrates a configuration of a C-plane (Control plane) in an LTE network architecture. As illustrated in FIG. 1, in an access stratum (Access Stratum, AS), UE 20 (User equipment/User device) and E-UTRAN are connected using radio protocols via a radio interface (Uu: Radio interface between UTRAN and UE). In the access stratum, E-UTRAN and EPC are connected using S1 protocols via an S1 interface. The S1 interface is a logical interface between eNB 10 (evolved Node B) contained in the E-UTRAN and the EPC. The S1 interface provides an interconnection point between the E-UTRAN and the EPC, and is also a reference point.

As illustrated in FIG. 1, in a non-access stratum (NAS), a UE and an EPC are logically connected. For example, NAS control protocols between UE and EPC include EMM (EPS Mobility Management) and ESM (EPS Session Management) protocols. EPS is an Evolved Packet System. The EPC is composed of one or more core network devices, which can communicate with an eNB 10 or a UE 20.

Figure 2:
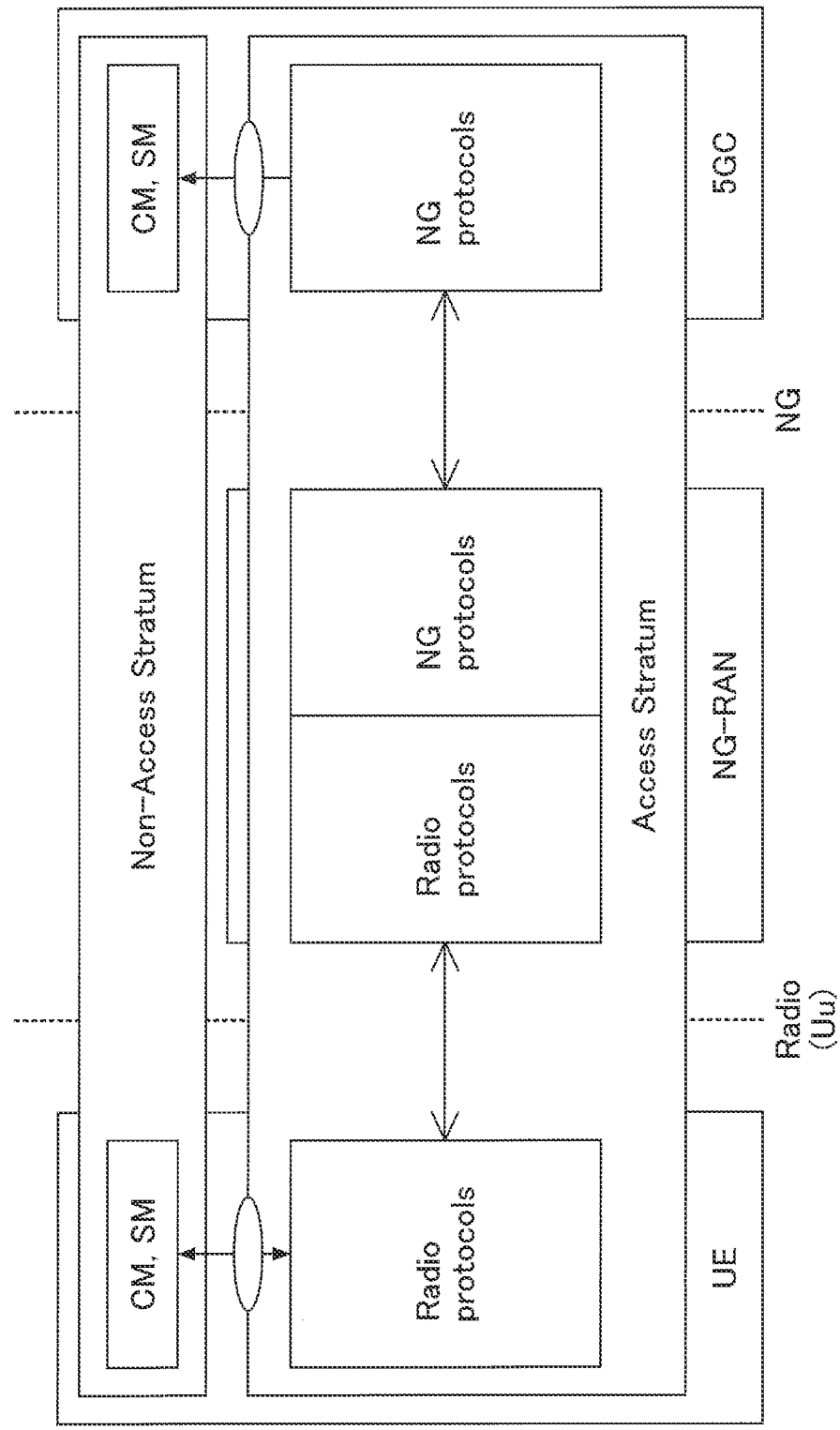
FIG. 2 is a diagram illustrating an example (2) of a network architecture according to an embodiment of the present invention.

FIG. 2 is a diagram illustrating an example (2) of a network architecture according to an embodiment of the present invention. FIG. 2 illustrates a configuration of a C-plane (Control plane) in an NR network architecture. As illustrated in FIG. 2, in the access stratum, UE, which is UE 20, and NG-RAN are connected using radio protocols via a radio interface (Uu). In the access stratum, NG-RAN and 5GC are connected using NG protocols via an NG interface. The NG interface is a logical interface between gNB (next generation Node B), which is a base station device included in NG-RAN and 5GC. The NG interface provides an interconnection point between NG-RAN and 5GC, and is also a reference point.

As illustrated in FIG. 2, in the non-access stratum (NAS), the UE and the 5GC are logically connected. For example, NAS control protocols between UE and 5GC include CM (Connection Management) and SM (Session Management) protocols. Note that the 5GC is composed of one or more core network devices, which can communicate with the eNB 10 or the UE 20.

Figure 3:
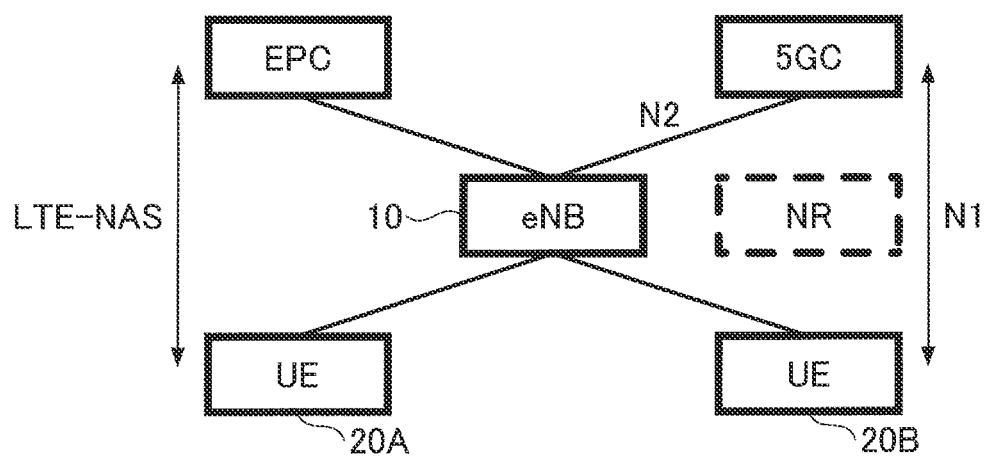
FIG. 3 is a diagram illustrating an example of a C-plane connection configuration in an embodiment of the present invention.

FIG. 3 is a diagram illustrating an example of a C-plane connection configuration according to an embodiment of the present invention. FIG. 3 illustrates a C-plane connection configuration established between a UE and each of an EPC and a 5GC.

As illustrated in FIG. 3, a UE 20A and an EPC are logically connected in the LTE-NAS as a C-plan connection configuration. The UE 20A is connected to the eNB 10 via a radio interface. The eNB 10 is connected via an EPC and an S1 interface. A U-plane (User plane) is connected to the UE 20A via the eNB 10.

As illustrated in FIG. 3, a UE 20B and the 5GC are logically connected via a reference point N1, as a C-plane connection configuration. The reference point N1 is a reference point between the UE and an AMF (Access and Mobility Management Function), one of the 5GC network functions. The UE 20B is connected to a network node of NR, such as gNB, via a radio interface. The network node of NR is connected to the 5GC via a reference point N2. The reference point N2 is a reference point between RAN (Radio Access Network) and AMF, one of the 5GC network functions (NFs). The U-plane is connected to the UE via the network nodes of eNB and NR. The operation of the UE 20B illustrated in FIG. 3 is called NR non-stand-alone (NSA), and communication is performed with application of the LTE-NR dual connectivity (E-UTRA-NR Dual connectivity, EN-DC).

Figure 4:
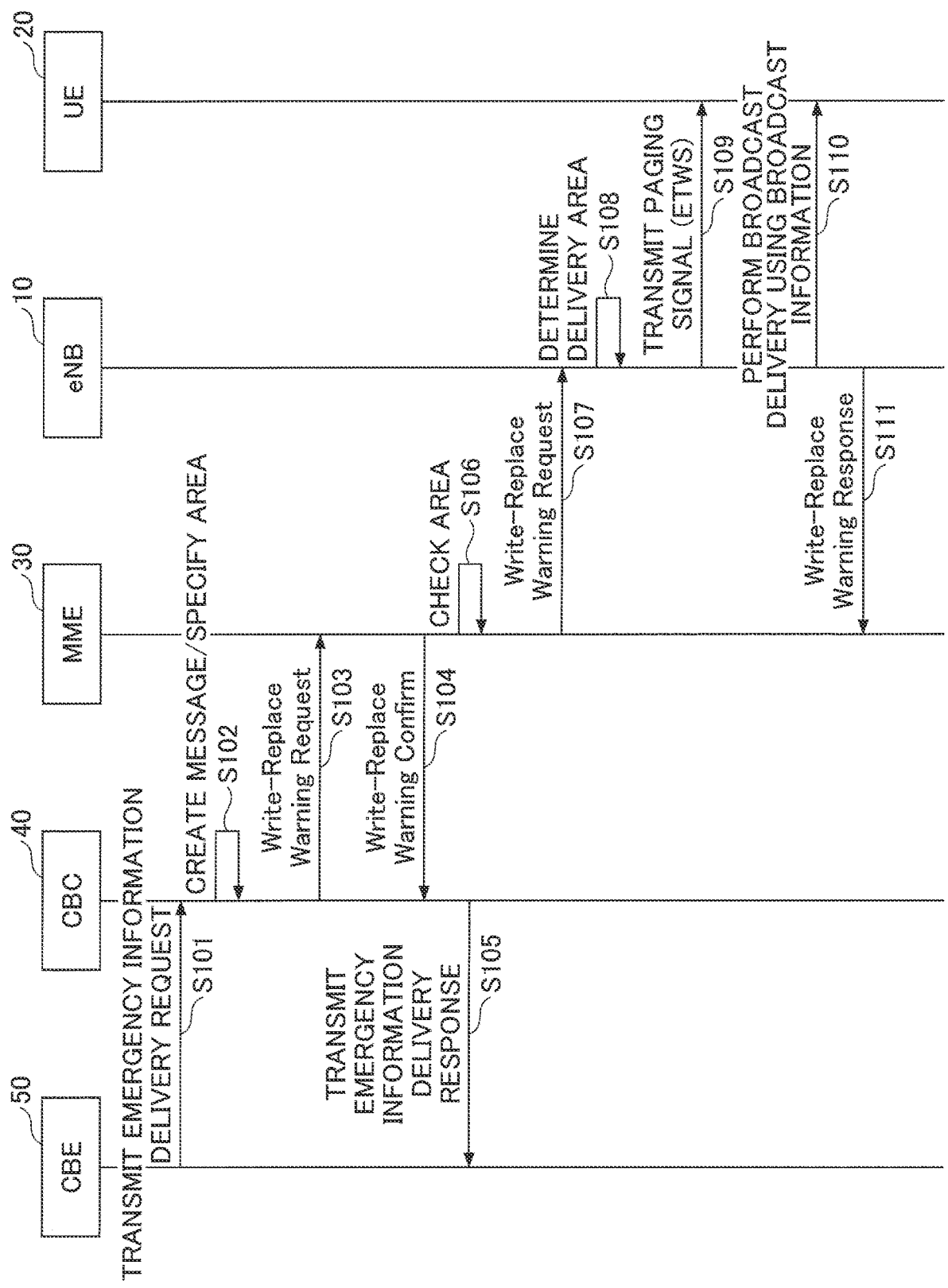
FIG. 4 is a sequence diagram illustrating a message delivery procedure according to an embodiment of the present invention.

FIG. 4 is a sequence diagram illustrating a message delivery procedure according to an embodiment of the present invention. FIG. 4 illustrates a sequence in which a message of ETWS (Earthquake and Tsunami Warning System), such as Earthquake Early Warning, is delivered in an LTE system. CBE 50 (Cell Broadcast Entity) illustrated in FIG. 4 is a delivery source of emergency information, such as the Japan Meteorological Agency. The CBE 50 is connected to CBC 40 (Cell Broadcast Center). MME 30 (Mobility Management Entity) is a network node that includes plurality of eNBs 10, and provides mobility control functions.

In step S101, the CBE 50 transmits an emergency information delivery request to the CBC 40. Subsequently, the CBC 40 creates an emergency information message, and specifies an area to which the message is delivered (S102). The area specification may be performed, for example, by cells or by areas.

Figure 5:
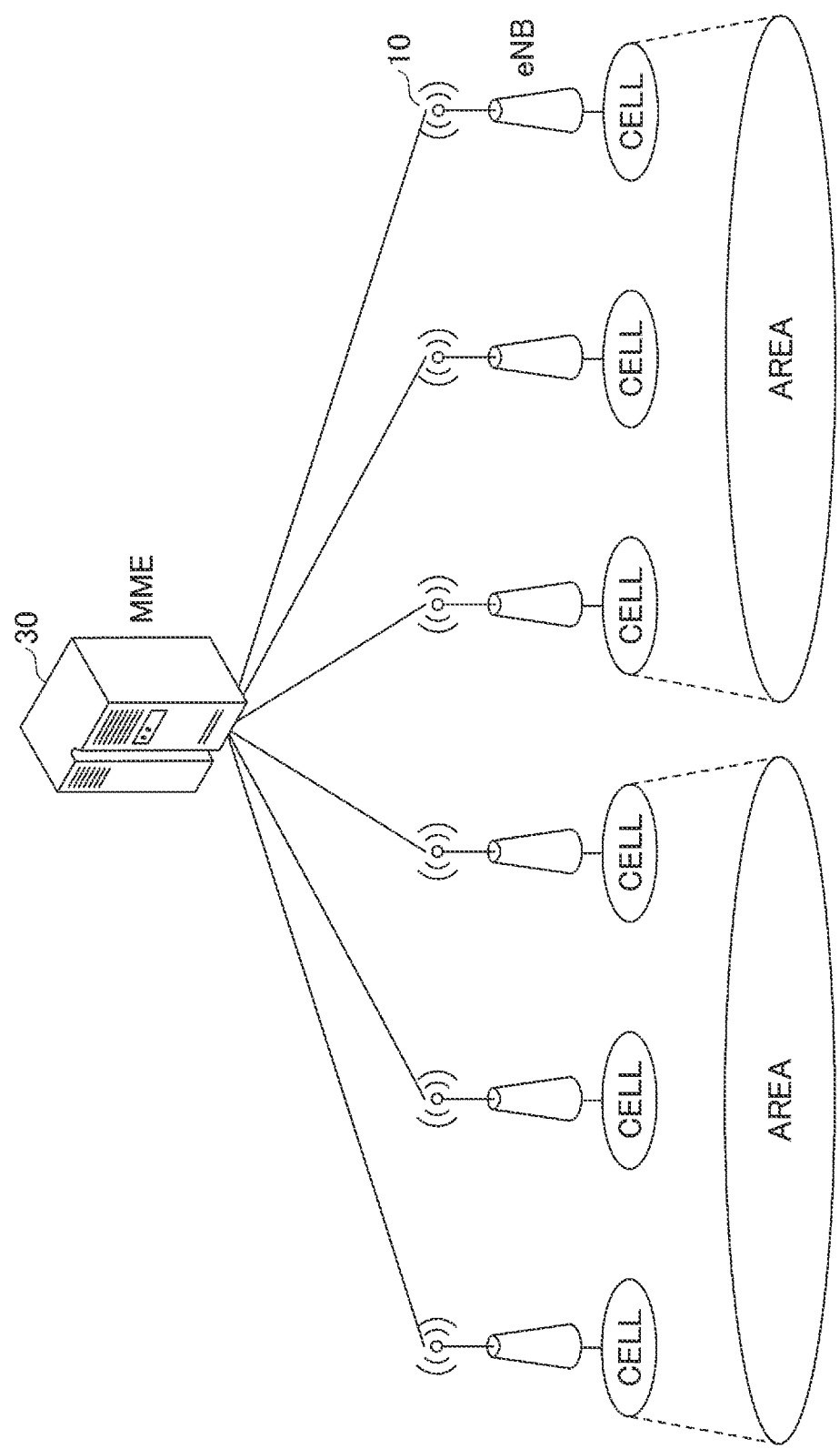
FIG. 5 is a diagram illustrating an example of a delivery area according to an embodiment of the present invention.

FIG. 5 is a diagram illustrating an example of a delivery area according to an embodiment of the present invention. As illustrated in FIG. 5, ETWS messages may be delivered to respective cells of the eNBs 10 contained in the MME 30, or ETWS messages may be delivered to respective areas each containing a plurality of cells.

The following illustrates by referring back to FIG. 4. In step S103, the CBC 40 transmits a "Write-Replace Warning Request" to the MME 30. The "Write-Replace Warning Request" is a signal for requesting emergency information to be transmitted from the CBC 40 to the MME 30, and to be subsequently transmitted from the MME 30 to the eNB 10. The "Write-Replace Warning Request" includes information such as disaster type, message body, and delivery area. Subsequently, the MME 30 transmits "Write-Replace Warning Confirm" to the CBC 40 (S104) The "Write-Replace Warning Confirm" is a response to the "Write-Replace Warning Request". In step S105, the CBC 40 transmits an emergency information delivery response to the CBE 50.

In step S106, the MME 30 performs an area check. The MME 30 specifies an eNB 10 as a delivery destination, based on the delivery area information included in the received "Write-Replace Warning Request". Subsequently, the MME 30 transmits the "Write-Replace Warning Request" to the specified eNB 10 (S107).

In step 108, the eNB 10 performs a delivery area determination process. When the received "Write-Replace Warning Request" contains a list of cells as a delivery area, the eNB 10 searches the list of cells for cells under the control of the eNB 10, and broadcasts messages to the cells included in the list of cells. When, for example, a TAI (Tracking Area Identity) list is set as the delivery area, the eNB 10 searches the TAI list under the control of the eNB 10 for cells included in a corresponding TA, and broadcasts messages to the cells included in the corresponding TA. Similarly, even when the delivery area includes a list of other areas (e.g., EA: Emergency Area), the eNB 10 broadcasts messages to cells included in the corresponding area.

In step S109, the eNB 10 transmits a paging signal of ETWS to the UE 20 located in the cell, which is included in the delivery area determined in step S108. Subsequently, the eNB 10 performs broadcast delivery using the broadcast information to the UE 20 in step S110. Subsequently, the eNB 10 transmits a "Write-Replace Warning Response" to the MME 30.

For example, the MME 30 may be replaced by an RNC (Radio Network Controller) or AMF to deliver ETWS messages in a similar sequence in a 3G or NR system.

Figure 6:
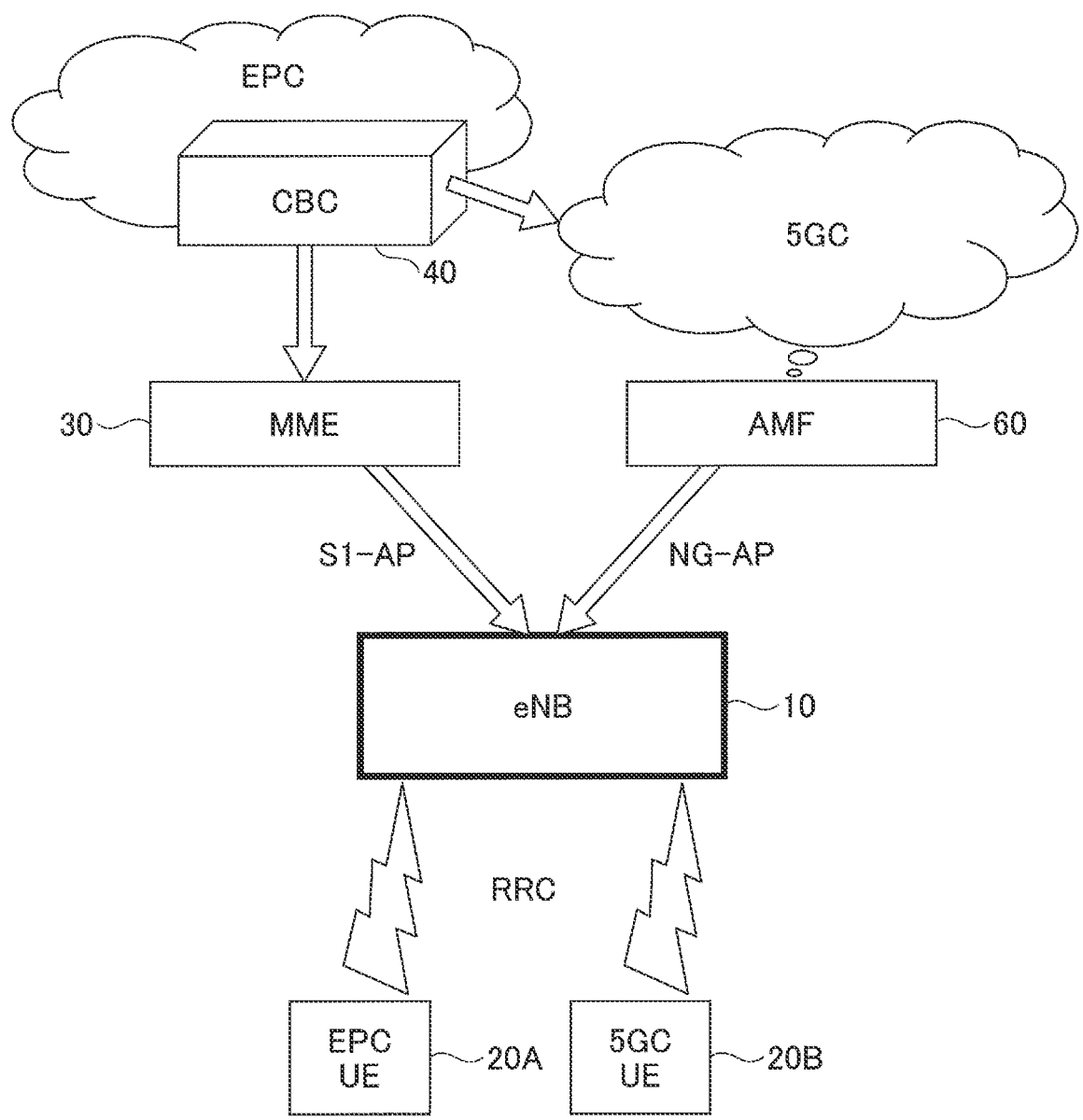
FIG. 6 is a diagram illustrating a communication system according to an embodiment of the present invention.

FIG. 6 is a diagram illustrating a communication system according to an embodiment of the present invention. The communication system illustrated in FIG. 6 includes an EPC, 5GC, CBC 40, MME 30, AMF 60, eNB 10, a UE 20A located in the EPC, and a UE 20B located in the 5GC. The MME 30 and eNB 10 are connected via an S1-AP interface. The MME 30 and eNB 10 are connected via a NG-AP interface. The UE 20A is connected to the eNB 10, and is located in the EPC. The UE 20B is connected to the eNB 10 by the above-described EN-DC with reference to FIG. 3, and is located in the 5GC. The CBC 40 may belong to the EPC or may be disposed at any location on the network without belonging to the EPC.

In the communication system illustrated in FIG. 6, in order to request delivery of emergency information, the CBC 40 transmits a "Write-Replace Warning Request" to the MME 30. Furthermore, when a base station connected to the 5GC is not connected to the EPC or the MME 30, the "Write-Replace Warning Request" is transmitted via the AMF 60, because emergency information is required be delivered to the base station.

Note that the UE 20B located in the 5GC can receive ETWS messages through paging, which is RRC (Radio Resource Control) signaling and system information, based on the "Write-Replace Warning Request" transmitted from the CBC 40 via the MME 30 to the eNB 10. However, since the "Write-Replace Warning Request" has been transmitted from the CBC 40 via the AMF 60 to the eNB 10, there is a possibility that ETWS messages will be processed in a duplicated manner in the eNB 10 or UE 20. Hence, when delivery of emergency information is activated in a network including the eNB 10 that is connected to a plurality of core networks, it is necessary to prevent delivery of emergency information, which is identical to emergency information delivered via a certain core network, from being activated from another core network.

Figure 7:
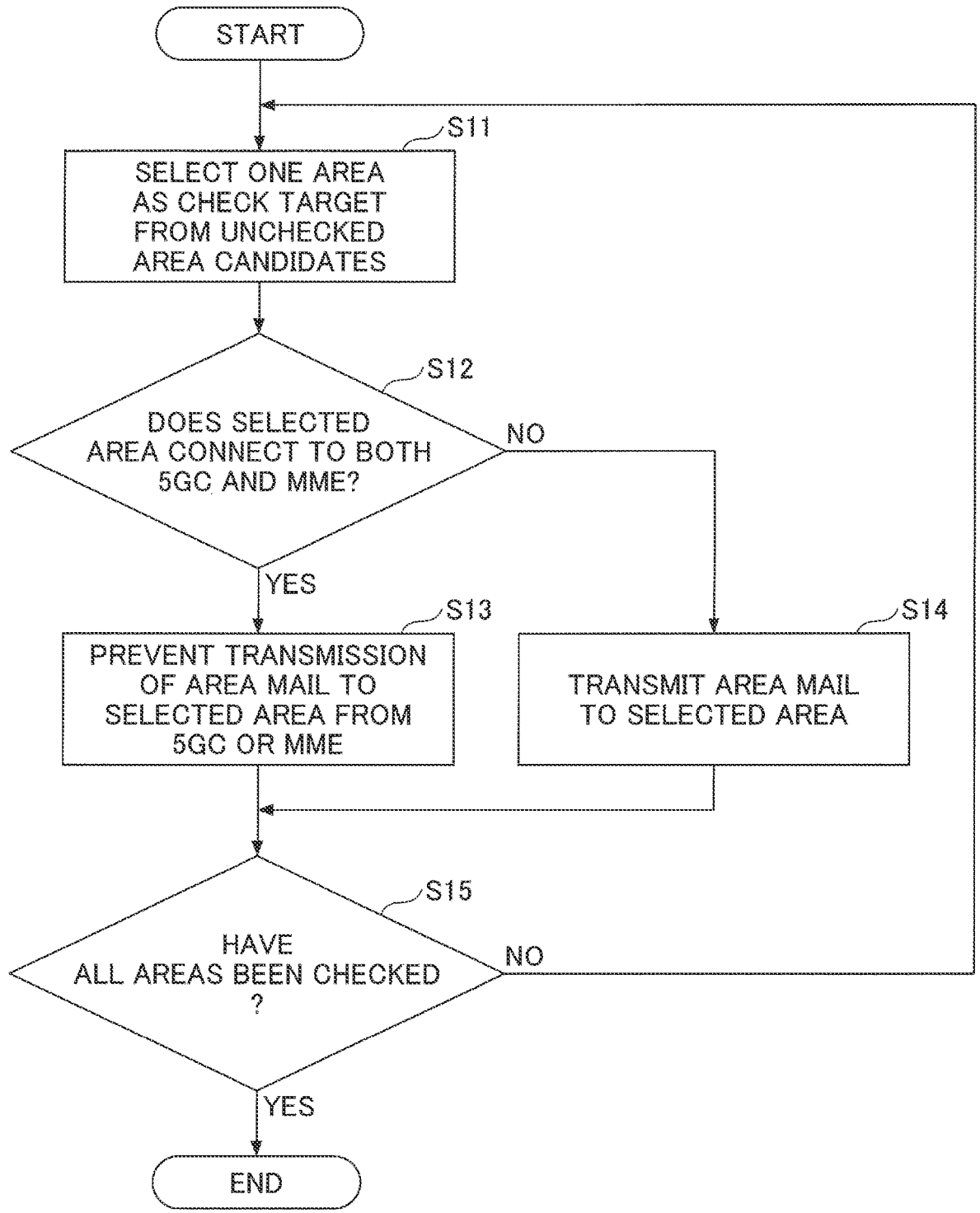
FIG. 7 is a flowchart illustrating an operation of CBC 40 according to an embodiment of the present invention.

FIG. 7 is a flowchart illustrating an operation of CBC 40 according to an embodiment of the present invention. FIG. 7 is a flowchart illustrating an area specifying process when a request for delivering emergency information is made from the CBC 40. In the following, the emergency information to be delivered may hereinafter also be called an "area mail". The area specifying process in FIG. 7 corresponds to the process in step S102 of FIG. 4. The CBC 40 is supposed to have information about the eNB 10 or an area, which connects to both the 5GC and MME.

In step S11, the CBC 40 selects one area from unchecked area candidates that are a target for delivering emergency information (i.e., an area mail). Subsequently, the CBC 40 determines whether the selected area is connected to both the 5GC and the MME (S12). When the selected area is connected to both 5GC and MME (YES in S12), then the process proceeds to step S13, and when the selected area is not connected to both of 5GC and MME (NO in S12), then the process proceeds to step S14.

In step S13, the CBC 40 prevents one of area mails from 5GC and MME from being transmitted to the selected area that is connected to both the 5GC and the MME. In step S14, the CBC 40 transmits an area mail to the selected area that is not connected to both of 5GC and MME. The prevention of area mail transmission in step S13 may be performed by not including the selected area in the "Write-Replace Warning Request" delivery area. The transmission of an area mail in step S14 may be performed by including an area, to which transmission of an area mail is performed, in the "Write-Replace Warning Request" delivery area.

In step S15, whether all the areas have been checked is determined. When all the areas have been checked (YES in S15), the process of the flowchart ends, and when not all the areas have been checked (NO in S15), the process proceeds to step S11.

Note that in step S11 to step S15, the "area" may be replaced with "base station" or "cell," and the "area mail" may be another name insofar as the area mail is a message for delivering emergency information from ETWS or the like.

Further, in step S12, whether an area is connected to three or more core networks may be determined, and in step S13, transmission of an area mail from the three or more core networks other than one core network may be prevented.

In the procedure from step S11 to step S15, the CBC 40 is enabled to prevent one of area mails from 5GC and MME from being transmitted to an area that is a target for area mail transmission and is connected to both 5GC and MME, and the CBC 40 is enabled to transmit an area mail to an area that is a target for area mail transmission and is not connected to both of 5GC and MME. That is, when delivery of emergency information is activated in a network including eNB 10 that is connected to a plurality of core networks, it is possible to prevent delivery of emergency information, which is identical to emergency information delivered via a certain core network, from being activated from another core network.

Figure 8:
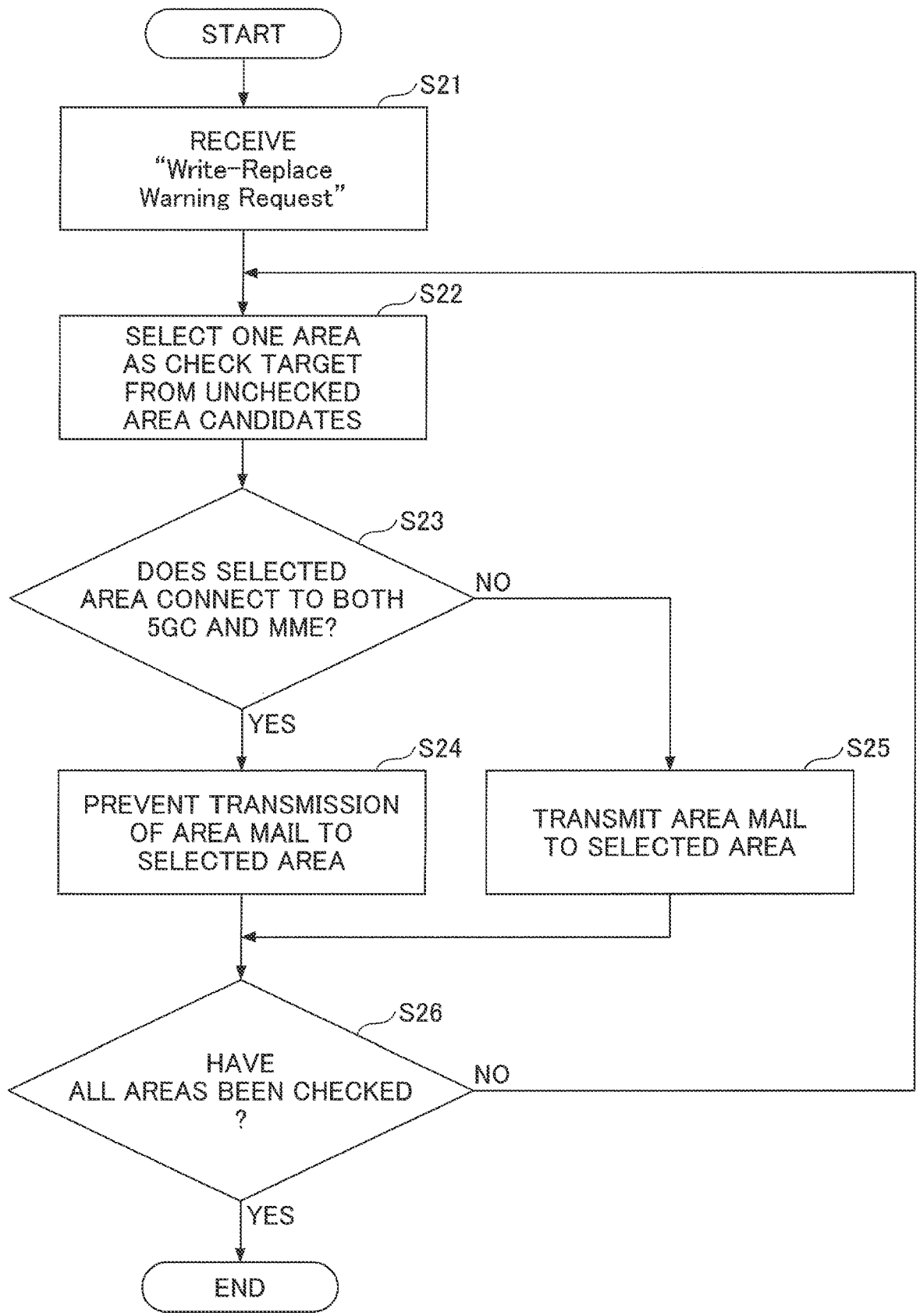
FIG. 8 is a flowchart illustrating an operation of MME 30 or AMF 60 according to an embodiment of the present invention.

FIG. 8 is a flowchart illustrating an operation of the MME 30 or AMF 60 according to an embodiment of the present invention. FIG. 8 is a flowchart illustrating an area specifying process when an emergency information delivery request is transmitted from the MME 30 or the AMF 60. The area specifying process illustrated in FIG. 8 corresponds to the process in step S106 of FIG. 4. The MME 30 or AMF 60 is supposed to have information pertaining to the eNB 10 or an area, which is connected to both the 5GC and MME. The flowchart illustrated in FIG. 8 is performed only on either MME 30 or AMF 60.

In step S21, the MME 30 or AMF 60 receives a "Write-Replace Warning Request". Subsequently, the MME 30 or AMF 60 selects one area from the unchecked area candidates based on the information about the delivery area included in the "Write-Replace Warning Request". Subsequently, the MME 30 or AMF 60 determines whether the selected area is connected to both 5GC and MME (S23). When the selected area is connected to both 5GC and MME (YES in S23), then the process proceeds to step S24, and when the selected area is not connected to both of 5GC and MME (NO in S23), then the process proceeds to step S25.

In step S24, the MME 30 or AMF 60 prevents area mail transmission to the selected area connected to both 5GC and MME. The prevention of area mail transmission in step S24 may be performed by not including the selected area in the "Write-Replace Warning Request" delivery area. Further, the prevention of area mail transmission in step S24 may be performed by not transmitting the area mail. The transmission of an area mail in step S25 may be performed by including an area, to which transmission of an area mail is performed, in the "Write-Replace Warning Request" delivery area. Further, the area mail transmission in step S25 may be performed by transmitting the area mail.

In step S25, the MME 30 or AMF 60 transmits the area mail to the area not connected to both of 5GC and MME. In step S26, whether all the areas have been checked is determined. When all the areas have been checked (YES in S26), the process of the flowchart ends, and when not all the areas have been checked (NO in S26), the process proceeds to step S11.

Note that in step S21 to step S26, the "area" may be replaced with "base station" or "cell," and the "area mail" may be another name insofar as the area mail is a message for delivering emergency information from ETWS or the like.

Alternatively, in step S23, whether an area is connected to three or more core networks may be determined. In such a case, the process of the flowchart of FIG. 8 may be performed on the devices corresponding to the MME 30 or AMF 60, which is connected to three or more core networks other than one core network.

In the procedure from step S21 to step S26, the MME 30 or AMF 60 is enabled to prevent one of area mails from 5GC and MME from being transmitted to an area that is a target for area mail transmission and is connected to both 5GC and MME, and the MME 30 or AMF 60 is enabled to transmit an area mail to an area that is a target for area mail transmission and is not connected to both of 5GC and MME. That is, when delivery of emergency information is activated in a network including eNB 10 that is connected to a plurality of core networks, it is possible to prevent delivery of emergency information, which is identical to emergency information delivered via a certain core network, from being activated from other core networks.

Figure 9:
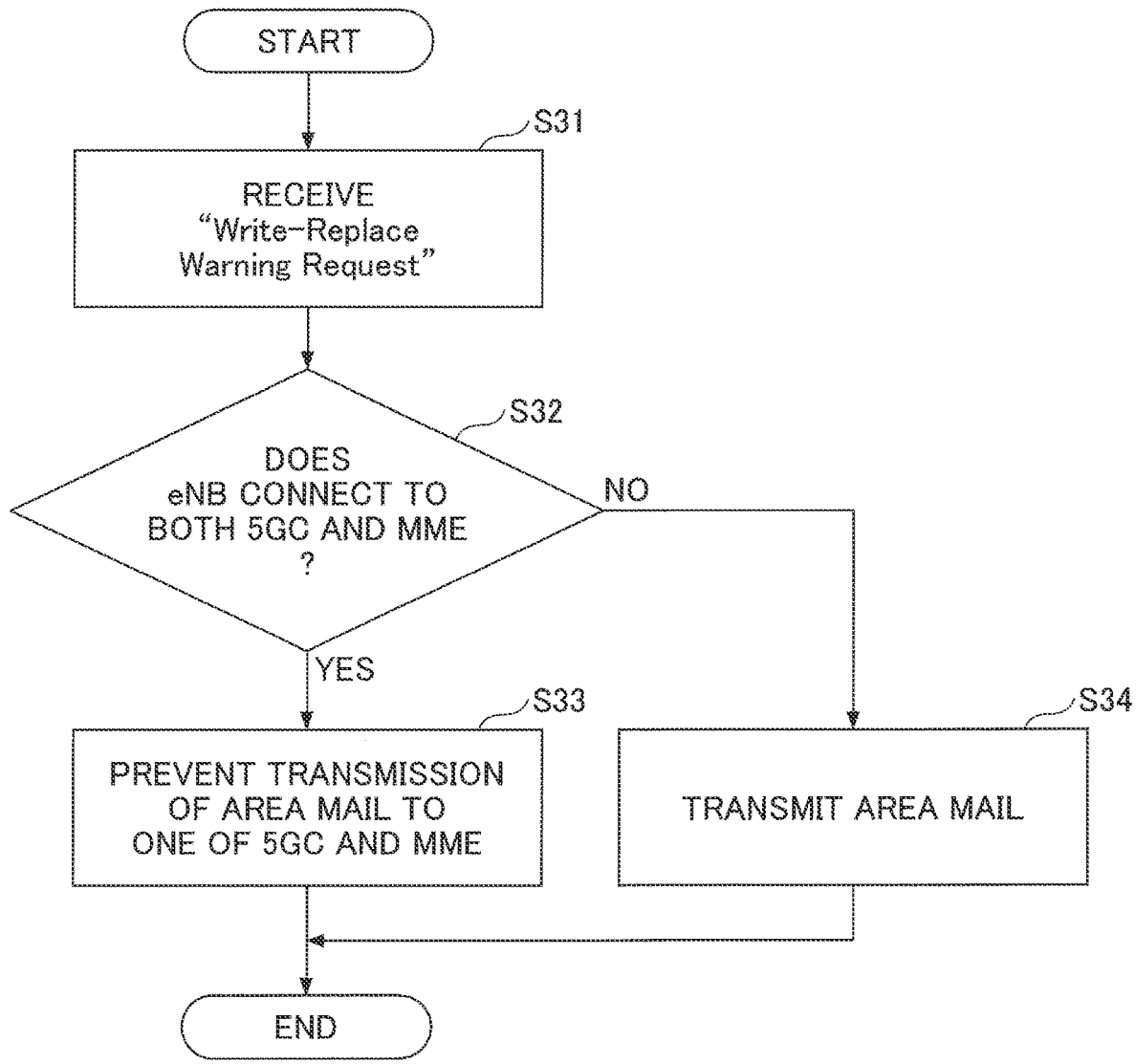
FIG. 9 is a flowchart illustrating an operation of eNB 10 according to an embodiment of the present invention.

FIG. 9 is a flowchart illustrating an operation of the eNB 10 in an embodiment of the present invention. FIG. 9 is a flowchart illustrating an area specifying process when an eNB 10 receives an emergency information delivery request. The area specifying process in FIG. 9 corresponds to the process in step S108 of FIG. 4. The eNB 10 is supposed to have information about the eNB 10 or the selected area connected to both the 5GC and MME.

In step S31, the eNB 10 receives a "Write-Replace Warning Request". Subsequently, the eNB 10 determines whether the eNB 10 connects to both 5GC and MME (S32). When the eNB 10 is connected to both 5GC and MME (YES of S32), the process proceeds to step S33, and when the eNB 10 is not connected to both of 5GC and MME (NO of S32), the process proceeds to step S34.

In step S33, the eNB 10 prevents transmission of one of area mails from 5GC and MME, and ends the process of the flowchart. In step S34, the eNB 10 transmits an area mail, and ends the process of the flowchart.

In step S33, when the eNB 10 is connected to three or more core networks, the area mail transmission activated by a core network other than one core network may be prevented.

Note that in step S31 to step S34, the "area mail" may be another name insofar as the area mail is a message for delivering emergency information from ETWS or the like.

In the procedure from step S31 to step S34, the eNB 10 is enabled to prevent one of area mails from 5GC and MME from being transmitted to an area that is a target for area mail transmission and is connected to both 5GC and MME, and the eNB 10 is enabled to transmit an area mail to an area that is a target for area mail transmission and is not connected to both of 5GC and MME. That is, when delivery of emergency information is activated in a network including eNB 10 that is connected to a plurality of core networks, it is possible to prevent delivery of emergency information, which is identical to emergency information delivered via a certain core network, from being activated from another core network.

In accordance with the above-described embodiments, the eNB 10, MME 30, AMF 60, or CBC 40 is enabled to prevent one of area mails from 5GC and MME from being transmitted to an area that is a target for area mail transmission and is connected to both 5GC and MME, and the eNB 10, MME 30, AMF 60, or CBC 40 is enabled to transmit an area mail to an area that is a target for area mail transmission and is not connected to both of 5GC and MME. Accordingly, when delivery of emergency information is activated in a network including eNB 10 that is connected to a plurality of core networks, it is possible to prevent delivery of emergency information, which is identical to emergency information delivered via a certain core network, from being activated from another core network.

That is, the base station device connected to the plurality of core networks is enabled to appropriately deliver a message to the user device.

(Configurations of Devices)

Next, a functional configuration example of the eNB 10 and the UE 20 for performing the above-described processes and operations will be described. The eNB 10 and the UE 20 include functions to implement the embodiments described above. However, the eNB 10 and UE 20 may each include only some of the functions in the embodiments.

<eNB 10>

Figure 10:
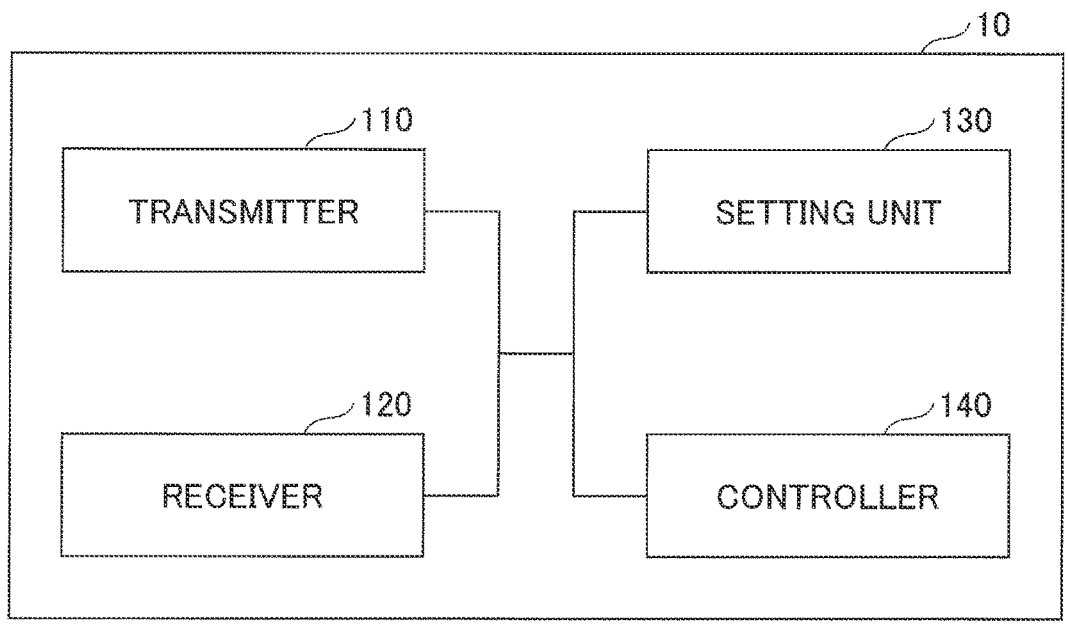
FIG. 10 is a diagram illustrating an example of a functional configuration of eNB 10 according to an embodiment of the present invention.

FIG. 10 is a diagram illustrating an example of a functional configuration of eNB 10 according to an embodiment of the present invention. As illustrated in FIG. 10, the eNB 10 includes a transmitter 110, a receiver 120, a setting unit 130, and a controller 140. The functional configuration illustrated in FIG. 10 is merely one example. Any terms for describing functional classification and functional components may be applied insofar as operations according to the embodiments are executable.

The transmitter 110 includes a function of generating a signal to be transmitted to the UE 20 side and transmitting the signal wirelessly. The transmitter 110 also transmits messages between network nodes to other network nodes. The receiver 120 includes a function of receiving various signals transmitted from the UE 20 and acquiring, for example, higher layer information from the received signals. The transmitter 110 has a function of transmitting NR-PSS, NR-SSS, NR-PBCH, DL/UL control signals, or the like to the UE 20. The receiver 120 receives messages between network nodes from other network nodes.

The setting unit 130 stores in the storage device preset setting information and various setting information to be transmitted to the UE 20, and reads the preset setting information from the storage device as necessary. The contents of the setting information are, for example, setting information pertaining to UE 20 communications such as radio bearer or secondary cell setting.

The controller 140 controls communications including communications of the UE 20 and the EN-DC as described in the embodiments. The controller 140 may also communicate with the EPC and the 5GC. A functional unit relating to signal transmission in the controller 140 may be included in the transmitter 110, and a functional unit relating to signal reception in the controller 140 may be included in the receiver 120. The MME 30, CBC 40, or AMF 60 may have functions similar to the eNB 10, except for the function relating to the radio communication interface with the UE 20.

<UE 20>

Figure 11:
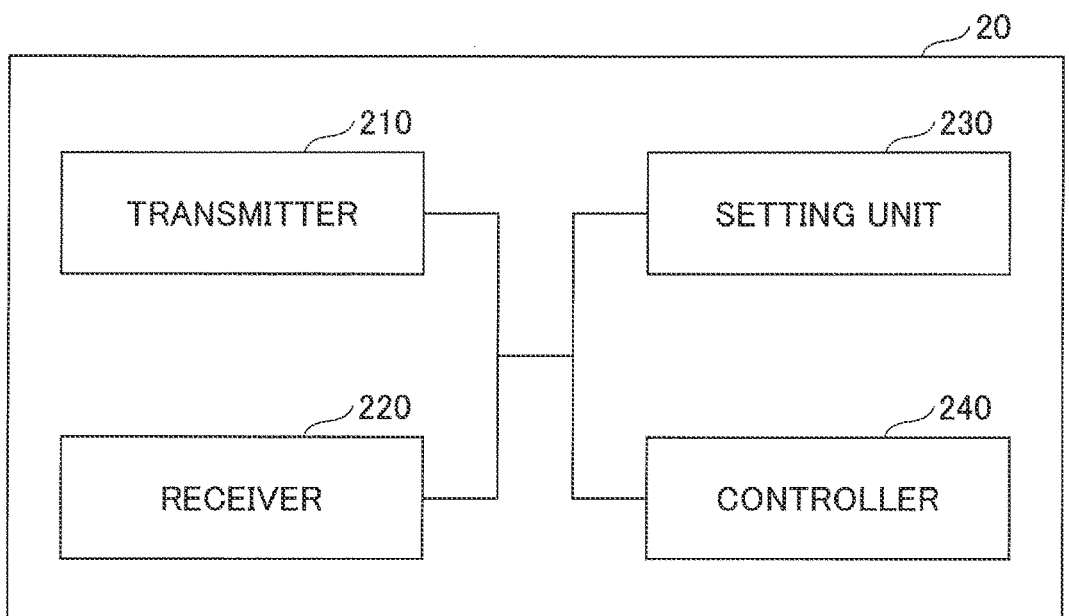
FIG. 11 is a diagram illustrating an example of a functional configuration of UE 20 according to an embodiment of the present invention.

FIG. 11 is a diagram illustrating an example of a functional configuration of the UE 20. As illustrated in FIG. 11, the UE 20 includes a transmitter 210, a receiver 220, a setting unit 230, and a controller 240. The functional configuration illustrated in FIG. 11 is merely one example. Any terms for describing functional classification and functional components may be applied insofar as operations according to the embodiments are executable.

The transmitter 210 creates a transmission signal from the transmission data and wirelessly transmits the transmission signal. The receiver 220 receives various signals wirelessly and acquires higher layer signals from the received signal of the physical layer. The receiver 220 has a function of receiving NR-PSS, NR-SSS, NR-PBCH, DL/UL/SL control signals or the like transmitted from the eNB 10. For example, the transmitter 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to another UE 20 as D2D communication, and the receiver 120 receives PSCCH, PSSCCH, PSDCH, or PSBCH from another UE 20.

The setting unit 230 stores various setting information received from the eNB 10 or the UE 20 via the receiver 220 in the storage device and reads the various setting information from the storage device as necessary. The setting unit 230 also stores preset information. The contents of the setting information are, for example, setting information pertaining to UE 20 communications such as radio bearer or secondary cell setting.

The controller 240 performs radio communication including EN-DC as described in the embodiments. The controller 240 receives information pertaining to radio communication from the eNB 10, controls the radio communication of the UE 20 based on the information, and reports the necessary information to the eNB 10. The controller 240 may be located in the EPC or 5GC. A functional unit relating to signal transmission in the controller 240 may be included in the transmitter 210, and a functional unit relating to signal reception in the controller 240 may be included in the receiver 220.

(Hardware Configuration)

The functional configuration diagrams (FIGS. 10 and 11) used to describe the embodiment of the present invention described above illustrate blocks of functional units. These functional blocks (components) are implemented by any combination of hardware and/or software. In addition, the means for implementing each functional block is not particularly specified. That is, each functional block may be implemented by a single device having physically and/or logically combined multiple elements, or may be implemented by two or more physically and/or logically separated devices that may be directly and/or indirectly connected (e.g., wired and/or radio).

Figure 12:
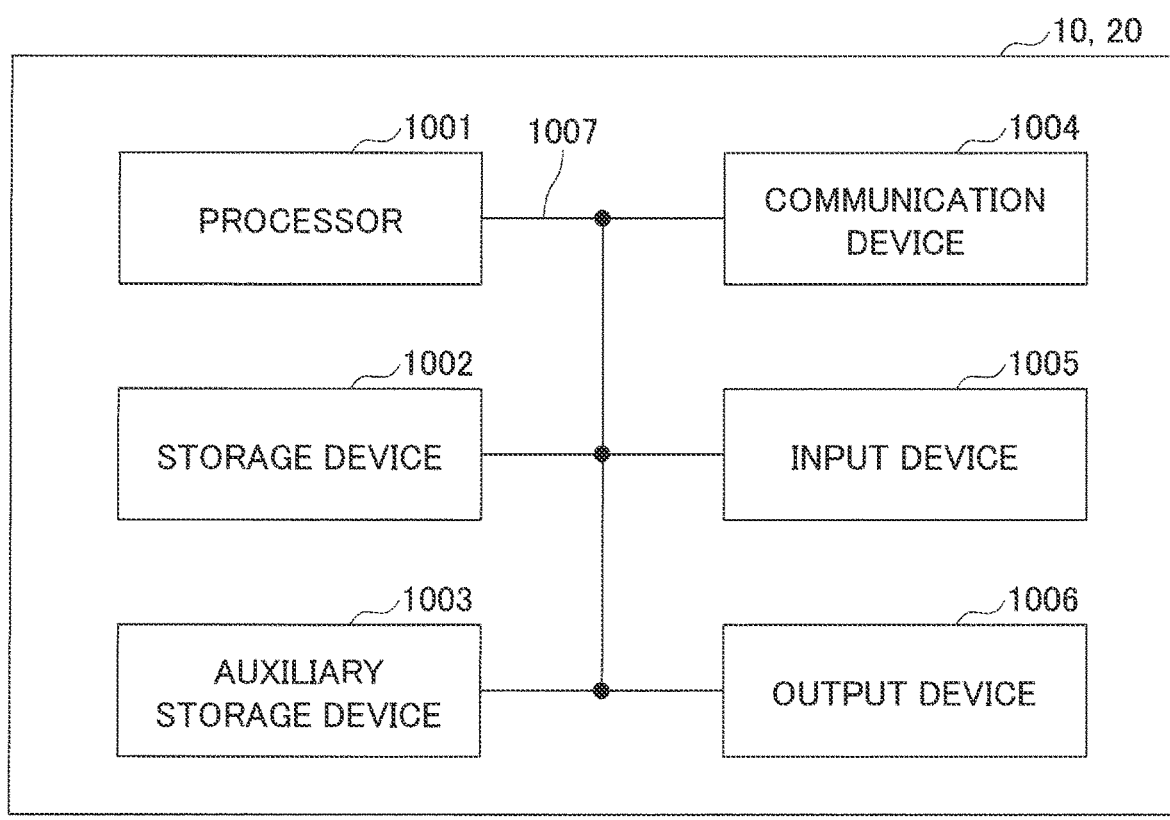
FIG. 12 is a diagram illustrating an example of a hardware configuration of eNB 10 or UE 20 according to an embodiment of the present invention.

For example, both the eNB 10 and the UE 20 in one embodiment of the invention may function as a computer that performs processing in accordance with the embodiment of the invention. FIG. 12 is a diagram illustrating an example of a hardware configuration of a radio communication device that is an eNB 10 or a UE 20 according to the embodiments of the present invention. Each of the above-described eNBs 10 and UE 20 may be physically configured as a computer device including, a processor 1001, a storage device 1002, an auxiliary storage device 1003, a communication device 1004, an input device 1005, an output device 1006, a bus 1007, and the like.

In the following description, the term "devices" can be read as circuits, apparatuses, units, etc. The hardware configurations of the eNB 10 and the UE 20 may be configured to include one or more of the devices illustrated in the figure at 1001-1006, or they may be configured without some of the devices.

Each function in the eNB 10 and the UE 20 is implemented by having a processor 1001 perform an operation by reading predetermined software (program) on hardware such as the processor 1001 and the storage device 1002, and controlling communication by the communication device 1004, reading and/or writing of data in the storage device 1002 and the auxiliary storage device 1003.

The processor 1001 operates, for example, an operating system to control the entire computer. The processor 1001 may be composed of a central processing unit (CPU) including an interface with peripheral devices, a controller, an arithmetic unit, a register, and the like.

The processor 1001 reads a program (program code), a software module, or data from the auxiliary storage device 1003 and/or the communication device 1004 to the storage device 1002 and performs various processes in accordance therewith. As a program, a program that executes at least a part of the operation described in the above-described embodiment is used. For example, the transmitter 110, the receiver 120, the setting unit 130, and the controller 140 of the eNB 10 illustrated in FIG. 10 may be stored in the storage device 1002 and implemented by a control program operated by the processor 1001. For example, the transmitter 210, the receiver 220, the setting unit 230, and the controller 240 of the UE 20 illustrated in FIG. 11 may be stored in the storage device 1002 and implemented by a control program operated by the processor 1001. Although the foregoing processes have been described to be executed by one processor 1001, they may be executed simultaneously or sequentially by two or more processors 1001. The processor 1001 may be implemented in one or more chips. Note that the program may be transmitted from a network via an electric communication line.

The storage device 1002 may be a computer-readable recording medium composed of at least one of a ROM (Read Only Memory), an EPROM (Erasable Programmable ROM), an EEPROM (Electrically Erasable Programmable ROM), a RAM (Random Access Memory) and the like. The storage device 1002 may be referred to as a register, a cache, a main memory (a main storage), or the like. The storage device 1002 may store executable programs (program codes), software modules, and the like for implementing a process according to the embodiments of the present invention.

The auxiliary storage device 1003 is a computer-readable recording medium composed, for example, of at least one of an optical disk such as a CD-ROM (Compact Disc ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, and a magnetic strip. The auxiliary storage device 1003 may be referred to as an auxiliary storage. The above-described storage medium may be, for example, a database, a server, or another appropriate medium including the storage device 1002 and/or the auxiliary storage device 1003.

The communication device 1004 is hardware (transmission/reception device) for performing communication between computers via a wired and/or wireless network, and, for example, the communication device 1004 is also referred to as a network device, a network controller, a network card, a communication module, etc. For example, the transmitter 110 and the receiver 120 of the eNB 10 may be implemented by the communication device 1004. The transmitter 210 and the receiver 220 of the UE 20 may be implemented in the communication device 1004.

The input device 1005 is an input device (e.g., a keyboard, a mouse, a microphone, a switch, a button, a sensor, etc.) for receiving an input from outside. The output device 1006 is an output device (e.g., display, speaker, LED lamp, etc.) that performs output toward outside. The input device 1005 and the output device 1006 may be of an integrated configuration (e.g., a touch panel).

Each device, such as processor 1001 and storage device 1002, is connected by a bus 1007 for communicating information. The bus 1007 may comprise a single bus or may comprise different buses between devices.

The eNB 10 and the UE 20 may also include hardware such as a microprocessor, a digital signal processor (DSP), an ASIC (Application Specified Circuit), a PLD (Programmable Logic Device), and a FPGA (Field Programmable Gate Array), wherein the hardware may implement some or all of the functional blocks. For example, the processor 1001 may be implemented in at least one of these pieces of hardware.

Conclusion of the Embodiments

As described above, according to the embodiments of the present invention, there is provided a network node for connecting to a plurality of base station devices, the plurality of base station devices each being connected to one or a plurality of core networks belonging to different systems, the network node including a controller that controls delivery of emergency information identical to delivery of emergency information activated by a first core network of the plurality of core networks so that the delivery of the emergency information identical to the delivery of the emergency information activated by the first core network of the plurality of core networks is prevented from being activated by a core network other than the first core network; and a transmitter that transmits a message for a base station device to deliver emergency information.

According to the above-described configuration, MME 30, AMF 60, or CBC 40 can suppress, among areas that are targets of transmission of area mails, area mail transmission from one of 5GC and MME in an area connected to the 5GC and the MME, and can transmit area mails in an area that is connected to only one of the 5GC and the MME. Accordingly, when delivery of emergency information is activated in a network including eNB 10 connected to a plurality of core networks, delivery of emergency information identical to emergency information delivered via a certain network can be prevented from being activated by another network. Namely, a base station device that is connected to a plurality of core networks can appropriately deliver a message to a user device.

When an area in which a first base station device or the plurality of base station devices is included is connected to the plurality of core networks, the controller may include, in the message, information indicating that delivery of emergency information to the first base station device or the area is not performed in a core network other than the first core network among the plurality of core networks and information indicating that delivery of emergency information to the first base station device or the area is performed in the first core network. With this configuration, when delivery of emergency information is activated in a network including eNB 10 connected to a plurality of core networks, CBC 40 can suppress delivery of emergency information identical to emergency information delivered through a certain core network from being activated from another core network.

When the area in which the first base station device or the plurality of base station devices is included is not connected to the plurality of core networks, the controller may include, in the message, information indicating that delivery of emergency information to the first base station device or the area is performed. With this configuration, CBC 40 can transmit area mails in an area that is not connected to a plurality of core networks.

When an area in which a first base station device or the plurality of base station devices is included is connected to the plurality of core networks, the controller need not perform delivery of emergency information to the first base station device or the area, or the controller may include, in the message, information indicating that delivery of emergency information to the first base station device or the area is not performed. With this configuration, when delivery of emergency information is activated in a network including eNB 10 connected to a plurality of core networks, MME 30 or AMF 60 can suppress delivery of emergency information identical to emergency information delivered via a certain core network from being activated by another network.

When the area in which the first base station device or the plurality of base station devices is included is not connected to the plurality of core networks, the controller may perform delivery of emergency information to the first base station device or the area, or the controller may include, in the message, information indicating that delivery of emergency information to the first base station device or the area is performed. With this configuration, MME 30 or AMF 60 can transmit area mails in an area that is not connected to a plurality of core networks.

Furthermore, according to the embodiments of the present invention, there is provided a base station device connected to a plurality of core networks belonging to different systems, the base station including a receiver that receives a message for delivering emergency information; a controller that controls delivery of emergency information identical to delivery of emergency information activated by a first core network of the plurality of core networks so that the delivery of the emergency information identical to the delivery of the emergency information activated by the first core network of the plurality of core networks is prevented from being activated by a core network other than the first core network; and a transmitter that delivers the emergency information to a user device based on the message.

According to the above-described configuration, eNB 10, MME 30, AMF 60, or CBC 40 can suppress, among areas that are targets of transmission of area mails, area mail transmission from one of 5GC and MME in an area connected to the 5GC and the MME, and can transmit area mails in an area that is connected to only one of the 5GC and the MME. Accordingly, when delivery of emergency information is activated in a network including eNB 10 connected to a plurality of core networks, delivery of emergency information identical to emergency information delivered via a certain network can be prevented from being activated by another network. Namely, a base station device that is connected to a plurality of core networks can appropriately deliver a message to a user device.

Supplemental Embodiments

Embodiments of the present invention are described above. However, the present invention is not limited to the above-described embodiments, and a person skilled in the art may understand that variations, modifications, and replacements may be made to the above embodiments. Although specific values are used in the above descriptions to facilitate the understanding of the present invention, the values are just examples and other appropriate values may also be used unless otherwise mentioned. Grouping of subject matter in the above descriptions is not essential for the present invention. For example, subject matter described in two or more sections may be combined as necessary, and subject matter described in one section may be applied to subject matter described in another section unless they contradict each other. Boundaries of functional units or processing units in functional block diagrams do not necessarily correspond to boundaries of physical components. Operations of multiple functional units may be performed by one physical component, and an operation of one functional unit may be performed by multiple physical components. The order of steps in processes described in the embodiments may be changed as long as the consistency of the steps is maintained. Although functional block diagrams are used to describe the base station device and the user device, the base station device and the user device may be implemented by hardware, software, or a combination of them. Software to be executed by a processor of the base station device and software to be executed by a processor of the user device, according to the embodiments of the present invention may be stored in any appropriate storage medium such as a random access memory (RAM), a flash memory, a read-only memory (ROM), an EPROM, an EEPROM, a register, a hard disk drive (HDD), a removable disk, a CD-ROM, a database, or a server.

Information may also be reported using methods other than those described in the above embodiments. For example, information may be reported by physical layer signaling (e.g., downlink control information (DCI), uplink control information (UCI)), upper layer signaling (e.g., radio resource control (RRC) signaling, medium access control (MAC) signaling, broadcast information (master information block (MIB), system information block (SIB))), other signals, or a combination of them. Also, RRC signaling may be referred to as an RRC message and may be, for example, an RRC connection setup message or an RRC connection reconfiguration message.

The above-described embodiments may be applied to at least one of systems employing LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-Wideband), Bluetooth (registered trademark), and any other appropriate system, and a next generation system implemented by extending any one of these systems.

The order of steps in sequence charts and flowcharts described in the embodiments may be changed as long as the consistency of the steps is maintained. For example, the order of steps in a method described in the above embodiments is an example and may be changed to any appropriate order.

Specific operations performed by the base station device in the present application may be performed by an upper node of the base station device. In a network comprised of one or more network nodes including the base station device, various operations performed for communication with the user device may be performed by at least one of the base station device and a network node (which is, for example, but is not limited to, MME or S-GW) other than the base station device. In the above example, it is assumed that there is one network node other than the base station device. However, there may be two or more types of network nodes (e.g., MME and S-GW) other than the base station device.

Each of the embodiments/embodiments described herein may be used alone, in combination, or switched upon implementation.

The user device may also be referred to, by those skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other suitable terms.

The base station device may also be referred to, by those skilled in the art, as NB (Node B), eNB (evolved Node B), gNB (Next generation Node B, NR node B), Base Station, or several other suitable terms.

In some cases, the terms "determining" and "deciding" used in the disclosure include various operations. The terms "determining" and "deciding" can include, for example, "determination" and "decision" for judging, calculating, computing, processing, deriving, investigating, looking-up, or search inquiry (for example, looking-up in a table, a database, or other data structures), and ascertaining operations. In addition, the terms "determining" and "judging" can include "determination" and "decision" for receiving (for example, information reception), transmitting (for example, information transmission), input, output, and accessing (for example, accessing data in a memory) operations. The terms "determining" and "judging" can include "determination" and "decision" for resolving, selecting, choosing, establishing, and comparing operations. That is, the terms "determining" and "judging" can include "determination" and "decision" for any operation.

In the present disclosure, the term "on the basis of" used in the specification does not mean "on the basis of only" unless otherwise stated. In other words, the term "on the basis of" means both "on the basis of only" and "on the basis of at least."

In the present disclosure, when "include," "including," and modifications thereof are used, these terms are intended to be inclusive, similarly to the term "comprising". In addition, the term "or" used in the present disclosure does not mean exclusive OR.

In the entirety of the present disclosure, articles, such as "a", "an", or "the" in English that are added to a noun term by translation may indicate a plurality of the noun terms unless the articles obviously indicate a singular noun from the context.

Note that in the embodiments of the present invention, the eNB 10 is an example of a base station device. The CBC 40, MME 30, or AMF 60 is an example of a network node. The "Write-Replace Warning Request" is an example of a message for delivering emergency information. The core networks belonging to different systems are examples of EPC or 5GC.

While the invention has been described in detail, it will be apparent to those skilled in the art that the invention is not limited to the embodiments described herein. The invention can be implemented as modifications and modifications without departing from the spirit and scope of the invention as defined by the appended claims. Accordingly, the description herein is intended to provide an illustrative description and is not intended to have any restrictive meaning to the present invention.

This international patent application is based on and claims priority to Japanese Patent Application No. 2018-120108 filed on Jun. 25, 2018, and the entire content of Japanese Patent Application No. 2018-120108 is incorporated herein by reference.

LIST OF REFERENCE SYMBOLS

10 eNB
110 transmitter
120 receiver
130 setting unit
140 controller
UE
210 transmitter
220 receiver
230 setting unit
240 controller
MME
CBC
50 CBE
60 AMF
1001 processor
1002 storage device
1003 auxiliary storage device
1004 communication device
1005 input device
1006 output device

The invention claimed is:

1. A base station device for connecting to a first core network and a second core network that differs from the first core network, the base station device comprising:
   a receiver that receives a message for delivering emergency information; and
   a transmitter that transmits the emergency information to a user device, wherein one of the first core network and the second core network comprises an Evolved Packet Core (EPC) communicating with the base station device via a Mobility Management Entity (MME), and wherein the other of the first core network and the second core network comprises a 5G Core Network (SGC) communicating with the base station device via an Access and Mobility Management Function (AMF); and
   a controller that suppresses duplicate delivery of emergency information activated by the EPC communicating with the base station device via the MME and the 5GC communicating with the base station device via the AMF, based on a determination that the emergency information has been duplicated at the EPC when the user device is located in the 5GC and a Write Replace Warning Request has been received at the controller,
   wherein the delivery of the emergency information activated by the EPC and the 5GC is identical to each other.

2. The base station device according to claim 1, wherein, when an area in which the base station device is included is connected to the first core network and the second core network, the receiver obtains information indicating the delivery of emergency information to the base station device or the area from the message.

3. The base station device according to claim 2, wherein, when an area in which the base station device is included is connected to the first core network and the second core network, the receiver obtains, from the message, information indicating that the delivery of the emergency information to the base station device or the area is not performed in the second core network, and information indicating that the delivery of the emergency information to the base station device or the area is performed in the first core network.

4. The base station device according to claim 1, wherein the receiver receives messages including the emergency information from the first core network and the second core network, and
   wherein, when the message received from the first core network is identical to the message received from the second core network, the controller suppresses delivery of one message of the identical two messages, and the transmitter transmits the other message of the identical two message, delivery of the other message being not suppressed, to the user device.

5. A communication method executed by a base station device for connecting to a first core network and a second core network that differs from the first core network, the communication method comprising:
   a receiving procedure of receiving a message for delivering emergency information; and
   a transmission procedure of transmitting the emergency information to a user device, wherein one of the first core network and the second core network comprises an Evolved Packet Core (EPC) communicating with the base station device via a Mobility Management Entity (MME), and wherein the other of the first core network and the second core network comprises a 5G Core Network (SGC) communicating with the base station device via an Access and Mobility Management Function (AMF); and a control procedure of suppressing duplicate delivery of emergency information activated by the EPC communicating with the base station device via the MME and the 5GC communicating with the base station device via the AMF, based on a determination that the emergency information has been duplicated at the EPC when the user device is located in the 5GC and a Write Replace Warning Request has been received at the controller, wherein the delivery of the emergency information activated by the EPC and the 5GC is identical to each other.

6. The communication method according to claim 5, wherein the receiving procedure receives messages including the emergency information from the first core network and the second core network, and wherein, when the message received from the first core network is identical to the message received from the second core network, the control procedure suppresses delivery of one message of the identical two messages, and the transmission procedure transmits the other message of the identical two message, delivery of the other message being not suppressed, to the user device.

* * * * *